United States Patent
Lee (12)

(10) Patent No.: US 10,627,225 B2
(45) Date of Patent: Apr. 21, 2020

(54) ALIGNMENT INSPECTION APPARATUS AND LAMINATION INSPECTION SYSTEM HAVING THE SAME

(71) Applicant: SAMSUNG DISPLAY CO., LTD., Yongin-si, Gyeonggi-do (KR)

(72) Inventor: Jae Woo Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/261,951

(22) Filed: Jan. 30, 2019

(65) Prior Publication Data

US 2019/0257646 A1 Aug. 22, 2019

(30) Foreign Application Priority Data

Feb. 19, 2018 (KR) .................. 10-2018-0019446

(51) Int. Cl.
*G01B 11/27* (2006.01)
(52) U.S. Cl.
CPC .................. *G01B 11/272* (2013.01)
(58) Field of Classification Search
CPC ............... G01B 11/272; G01B 21/045; H01L 21/67259; H01L 21/682

USPC .................. 356/614–640, 399–401
See application file for complete search history.

(56) References Cited

U.S. PATENT DOCUMENTS

2019/0014664 A1 1/2019 Ahn et al.

FOREIGN PATENT DOCUMENTS

KR 10-2019-0006153 1/2019

*Primary Examiner* — Tri T Ton
(74) *Attorney, Agent, or Firm* — Lewis Roca Rothgerber Christie LLP (57) ABSTRACT

An alignment inspection apparatus and a lamination inspection system are provided. An alignment inspection apparatus includes: a camera configured to photograph an alignment between an upper plate and a lower plate which are laminated to generate image data of the alignment; an alignment calculator configured to calculate horizontal distances and vertical distances in a non-overlapping area where the upper plate and the lower plate do not overlap with each other using the image data to generate alignment data; and a misalignment detector configured to detect true defect data in which noise data is filtered using the horizontal distances and the vertical distances.

20 Claims, 10 Drawing Sheets

ALIGNMENT INSPECTION APPARATUS AND LAMINATION INSPECTION SYSTEM HAVING THE SAME

CROSS REFERENCE TO RELATED APPLICATION

This application claims priority to and the benefit of Korean Patent Application No. 10-2018-0019446, filed on Feb. 19, 2018 in the Korean Intellectual Property Office (KIPO), the entire disclosure of which is hereby incorporated by reference herein.

BACKGROUND

1. Field

Aspects of embodiments of the inventive concept relate to material laminating facilities and, more particularly, relate to an alignment inspection apparatus and a lamination inspection system having the same.

2. Discussion of Related Art

Processes by manufacturing facilities that manufacture a product by mounting a material include anisotropic conductive film (ACF) attachment between materials, pressurization, final compression, and unloading processes from a process of loading panels.

An alignment inspection apparatus may be applied to the bonding process and/or the pressing process to detect misalignment between an upper plate, or panel, and a lower plate, or panel, laminated together during the bonding process and/or the pressing process.

For example, a bonding alignment inspection, or check, may be performed by photographing alignment marks and analyzing the alignment marks.

SUMMARY

According to an aspect of embodiments, an alignment inspection apparatus is capable of filtering noise data erroneously detected in an alignment inspection.

According to an aspect of embodiments, a lamination inspection system includes the above-described alignment inspection apparatus.

According to one or more embodiments, an alignment inspection apparatus includes: a camera configured to photograph an alignment between an upper plate and a lower plate which are laminated to generate image data of the alignment; an alignment calculator configured to calculate horizontal distances and vertical distances in a non-overlapping area where the upper plate and the lower plate do not overlap with each other using the image data to generate alignment data; and a misalignment detector configured to detect true defect data in which noise data is filtered using the horizontal distances and the vertical distances.

In example embodiments, each of the horizontal distances may correspond to a shortest distance in a first direction (e.g., an X-axis direction) from each vertex detected based on a border of the upper plate to a border of the lower plate.

In example embodiments, each of the vertical distances may correspond to a shortest distance in a second direction (e.g., a Y-axis direction) from each vertex to the border of the lower plate.

In example embodiments, the alignment calculator may be configured to detect the upper plate as a virtual rectangle having first to fourth vertices using the image data, and to calculate first to fourth horizontal distances and first to fourth vertical distances based on the first to fourth vertices, respectively. The first vertex and the second vertex may form a first horizontal pair, the third vertex and the fourth vertex may form a second horizontal pair, the first vertex and the third vertex may form a first vertical pair, and the second vertex and the fourth vertex may form a second vertical pair.

In example embodiments, the misalignment detector may include a misalignment determiner configured to respectively compare the first to fourth horizontal distances with first to fourth horizontal distance references and the first to fourth vertical distances with first to fourth vertical distance references to generate misalignment data; and a true defect determiner configured to compare a first horizontal sum, which is a sum of the first horizontal distance and the second horizontal distance, with a horizontal noise reference, to compare a second horizontal sum, which is a sum of the third horizontal distance and the fourth horizontal distance, with the horizontal noise reference, to compare a first vertical sum, which is a sum of the first vertical distance and the third vertical distance, with a vertical noise reference, to compare a second vertical sum, which is a sum of the second vertical distance and the fourth vertical distance, with the vertical noise reference, and to determine whether the alignment data is true data based on results of the comparing.

In example embodiments, the misalignment determiner may be configured to generate the misalignment data when the first horizontal distance is out of the first horizontal distance reference and the second horizontal distance is out of the second horizontal distance reference.

In example embodiments, the misalignment determiner may be configured to generate the misalignment data when the third horizontal distance is out of the third horizontal distance reference and the fourth horizontal distance is out of the fourth horizontal distance reference.

In example embodiments, the misalignment determiner may be configured to generate the misalignment data when the first vertical distance is out of the first vertical distance reference and the third vertical distance is out of the third vertical distance reference.

In example embodiments, the misalignment determiner may be configured to generate the misalignment data when the second vertical distance is out of the second vertical distance reference and the fourth vertical distance is out of the fourth vertical distance reference.

In example embodiments, the true defect determiner may be configured to determine the misalignment data as the noise data when at least one of the first horizontal sum and the second horizontal sum is out of the horizontal noise reference.

In example embodiments, the true defect determiner may be configured to determine the misalignment data as the noise data when at least one of the first vertical sum and the second vertical sum is out of the vertical noise reference.

In example embodiments, the true defect determiner may be configured to determine the misalignment data as the true defect data when the first horizontal sum and the second horizontal sum satisfy the horizontal noise reference and the first vertical sum and the second vertical sum satisfy the vertical noise reference.

In example embodiments, the alignment calculator may include a vertex detector configured to calculate virtual extension lines of borders of the upper plate by using the image data, and to determine coordinates of intersections of the virtual extension lines as vertices of the upper plate; and a distance calculator configured to calculate the horizontal distances and the vertical distances between the vertices and borders of the lower plate, respectively.

In example embodiments, the alignment inspection apparatus may further comprise a defective material detector configured to calculate distances between the vertices to detect a size of the upper plate, and to compare the size of the upper plate with a reference size to determine whether a size of a material is defective or not.

In example embodiments, the defective material detector may be configured to generate size defect data when the size of the upper plate is out of the reference size.

According to one or more embodiments, a lamination inspection system includes: an alignment inspector configured to filter noise data and to inspect an alignment between an upper plate and a lower plate which are laminated by a manufacturing facility; a database configured to store material data including alignment data of upper and lower plates laminated materials and true defect data; and an interlocker configured to output an interlock signal to shut down the manufacturing facility based on a number of defective material data included in current cumulative data having a number of material data. The alignment inspector may include a camera configured to photograph vertices of the upper plate to generate image data; an alignment calculator configured to calculate horizontal distances and vertical distances in a non-overlapping area where the upper plate and the lower plate do not overlap with each other using the image data to generate the alignment data; and a misalignment detector configured to detect the true defect data in which the noise data is filtered using the horizontal distances and the vertical distances. The defective material data may include the true defect data.

In example embodiments, the interlocker may include a data updater configured to update the current cumulative data by adding current material data to the cumulative data while removing oldest material data included in the current cumulative data at each alignment inspection for each of the materials; and an interlock determiner configured to compare the number of defective material data included in the updated current cumulative data with a threshold value, and to output the interlock signal when the number of defective material data reaches the threshold value.

In example embodiments, the alignment inspector may be configured to remove the noise data without providing the noise data to the database.

In example embodiments, the alignment calculator may be configured to detect the upper plate as a virtual rectangle having first to fourth vertices using the image data, and to calculate first to fourth horizontal distances and first to fourth vertical distances based on the first to fourth vertices, respectively.

In example embodiments, the misalignment detector may include a misalignment determiner configured to respectively compare the first to fourth horizontal distances with first to fourth horizontal distance references and the first to fourth vertical distances with first to fourth vertical distance references to generate misalignment data; and a true defect determiner configured to compare a first horizontal sum, which is a sum of the first horizontal distance and the second horizontal distance, with a horizontal noise reference, to compare a second horizontal sum, which is a sum of the third horizontal distance and the fourth horizontal distance, with the horizontal noise reference, to compare a first vertical sum, which is a sum of the first vertical distance and the third vertical distance, with a vertical noise reference, to compare a second vertical sum, which is a sum of the second vertical distance and the fourth vertical distance, with the vertical noise reference, and to determine whether the alignment data is true data based on results of the comparing.

BRIEF DESCRIPTION OF THE DRAWINGS

Embodiments will be better understood from the following description of some example embodiments, taken in conjunction with the accompanying drawings, in which.

DETAILED DESCRIPTION

Some exemplary embodiments will be described more fully herein with reference to the accompanying drawings, in which various embodiments are shown.

Figure 1:
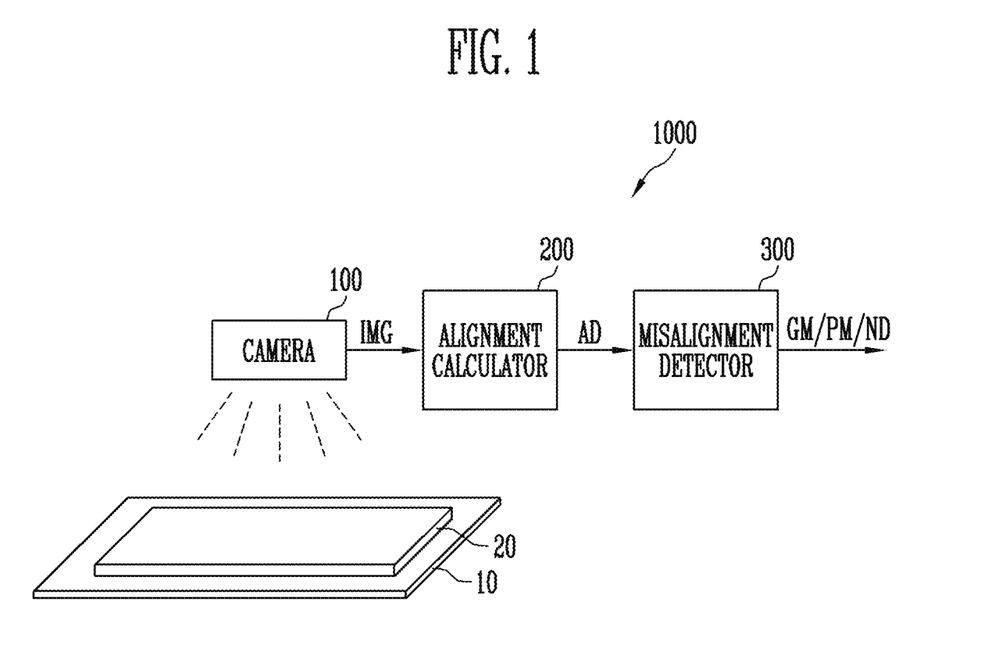
FIG. 1 is a block diagram of an alignment inspection apparatus according to an example embodiment.
Figure 2:
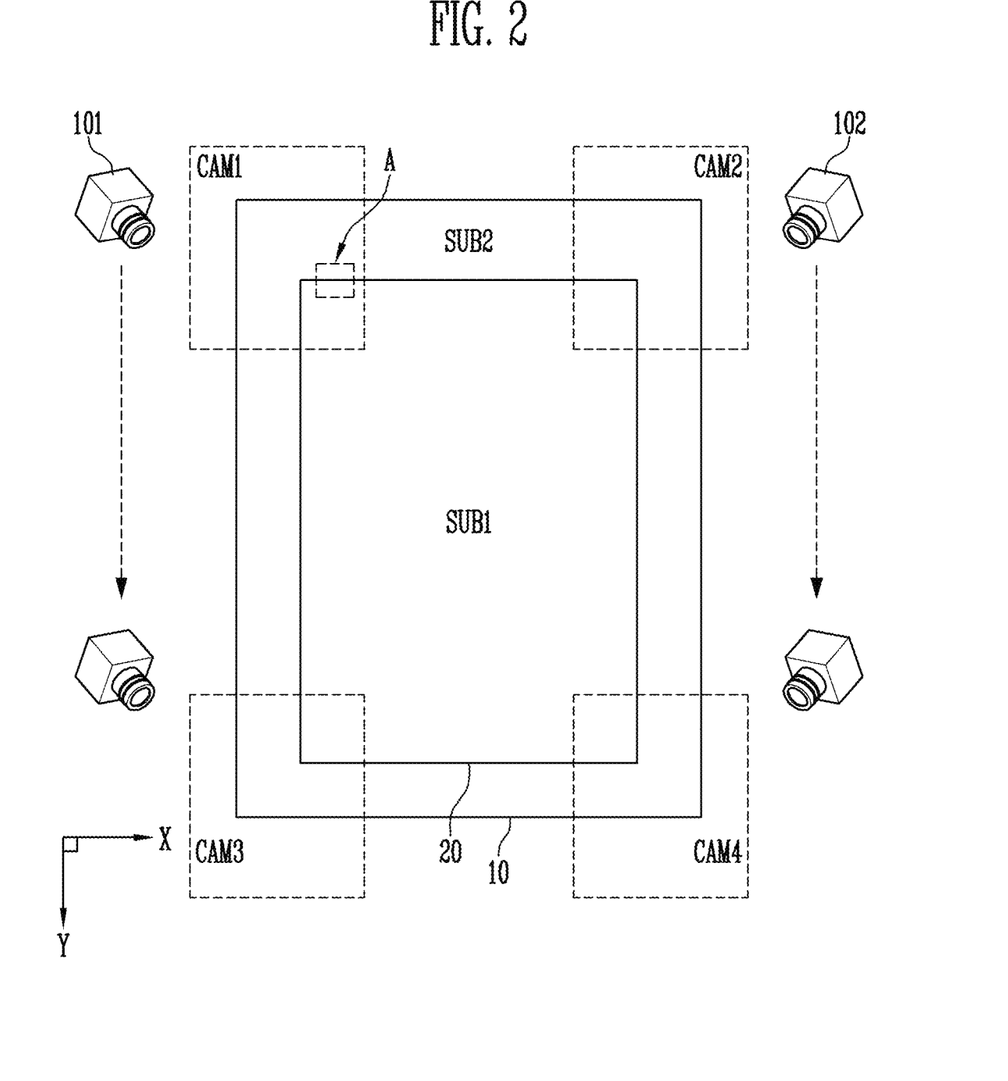
FIG. 2 is diagram illustrating an example of an operation of a camera included in the alignment inspection apparatus of FIG. 1.

FIG. 1 is a block diagram of an alignment inspection apparatus 1000 according to an example embodiment; FIG. 2 is diagram illustrating an example of an operation of a camera included in the alignment inspection apparatus of FIG. 1; and FIG. 3 is an enlarged view illustrating an image of a region "A" of the material of FIG. 2 taken by the camera.

Figure 3:
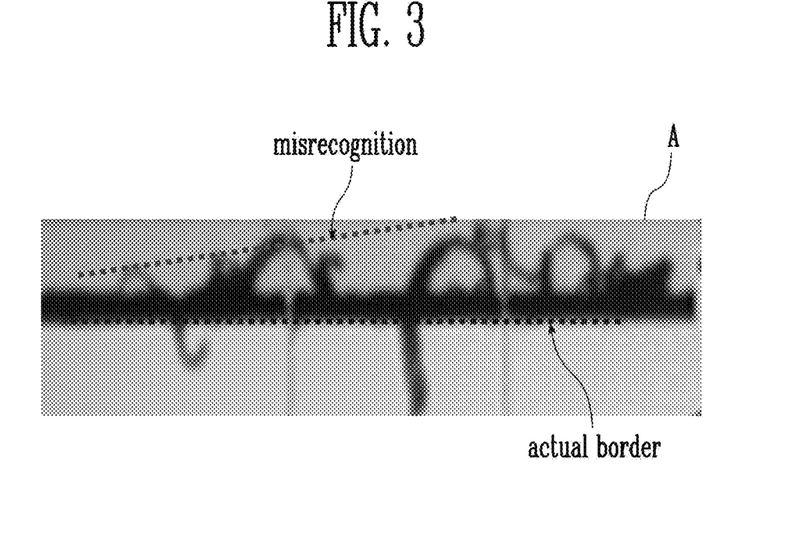
FIG. 3 is an enlarged view illustrating an image of a region "A" of a material of FIG. 2 taken by the camera.

Referring to FIGS. 1 to 3, the alignment inspection apparatus 1000 may include a camera, or camera unit, 100, an alignment calculator 200, and a misalignment detector 300.

The alignment inspection apparatus 1000 may be applied to a laminating facility that laminates a lower plate 10 and an upper plate 20 together. When an inspection target material having the lower plate 10 and the upper plate 20 laminated together is fixed on an inspection stage included in the laminating facility, the alignment inspection apparatus 1000 may detect misalignment between the lower plate 10 and the upper plate 20.

The material in which the lower plate 10 and the upper plate 20 are laminated together may constitute any of a flat panel display panel, a touch panel, a touch display panel, a flexible display panel, and the like, for example. For example, the upper plate 20 may be a film member or the like and may be attached onto the lower plate 10 in a manner such as film on glass (FOG). In some embodiments, the upper plate 20 may have a smaller area than the lower plate 10.

In some embodiments, when the material is determined to be misaligned, the alignment inspection apparatus 1000 may perform an automatic parameter control (APC) function to perform an alignment offset on the laminating facility in real time.

The camera 100 may take an image of an upper surface of the material in which the upper plate 20 and the lower plate 10 are laminated together. In an embodiment, as illustrated in FIG. 2, the camera 100 may include a plurality of cameras. The camera 100 may photograph corner portions of the material. In an embodiment, two cameras 101 and 102 may photograph an upper side of the material to obtain upper corner images CAM1 and CAM2, respectively. Then, after the cameras 101 and 102 move in a Y-axis direction Y (a vertical direction), lower side images of the material may be photographed to obtain lower corner images CAM3 and CAM4. However, the above description is provided as an example, and the number of cameras and the photographing positions are not limited thereto.

Image data IMG including the images CAM1, CAM2, CAM3, and CAM4 captured by the camera 100 may be provided to the alignment calculator 200.

The alignment calculator 200 may calculate horizontal distances and vertical distances in a non-overlapping area where the upper plate 20 and the lower plate 10 do not overlap with each other using the image data IMG to generate alignment data AD. The alignment calculator 200 may generate the alignment data AD including the horizontal distances and the vertical distances based on the image data IMG.

Each of the horizontal distances may correspond to the shortest distance in an X-axis direction X (a horizontal direction) from each of the vertices of the upper plate 20 to a border of the lower plate 10. Each of the vertical distances may correspond to the shortest distance in the Y-axis direction Y from each of the vertices of the upper plate 20 to the border of the lower plate 10. The horizontal distances and the vertical distances may be determined by the distance from a point (e.g., a predetermined point) set on the upper plate 20 to the border of the lower plate 10.

The alignment calculator 200 may recognize and detect the borders of the upper plate 20 based on the image data IMG. For example, the alignment calculator 200 may recognize border lines in each of the corner portions, and combine them to detect the upper plate 20 as a rectangular border.

As illustrated in FIG. 3, the image data IMG may include substantial border information, but may further include unwanted noise. Such noise may include cracks in materials, foreign objects, camera performance, and the like, and may cause an erroneous recognition. Thus, such noise is false information (pseudo defect) that should be ignored in the alignment inspection.

When the noise is recognized as the border of the upper plate and the material is determined to be a defective product, the operation of the laminating facility may be interrupted or additional inspection procedures such as visual inspection of defective products may proceed. Therefore, the productivity of the alignment inspection apparatus and the laminating facility may be lowered due to noise misrecognition, and the production cost may be increased.

However, in embodiments of the present disclosure, the alignment inspection apparatus 1000 may include the misalignment detector 300. The misalignment detector 300 may filter noise data ND using the horizontal distances and the vertical distances and detect true defect data (intrinsic defect data) GM.

The misalignment detector 300 may generate misalignment data by comparing the horizontal distances and the vertical distances with references (e.g., predetermined references), respectively. When both the horizontal distances and the vertical distances satisfy the references, the misalignment detector 300 may output passed inspection data PM, and the corresponding material can be determined as a normal product.

The misalignment detector 300 may determine whether the misalignment data is true (intrinsic). The misalignment detector 300 may generate the true defect data GM when it is determined that the information included in the misalignment data is a true defect. The misalignment detector 300 may output the noise data ND and/or the passed inspection data PM when the information included in the misalignment data is determined as noise.

The alignment calculator 200 and the misalignment detector 300 will be described in further detail with reference to FIGS. 4 to 7.

As described above, the alignment inspection apparatus 1000 according to example embodiments may detect the noise of the border information of the upper plate 20 included in the alignment data AD, and may separate the misalignment data into the true defect data GM and the noise data ND. Therefore, the accuracy of the alignment inspection and the productivity of the laminating facilities including the same may be greatly increased with a reduced manufacturing cost.

Figure 4:
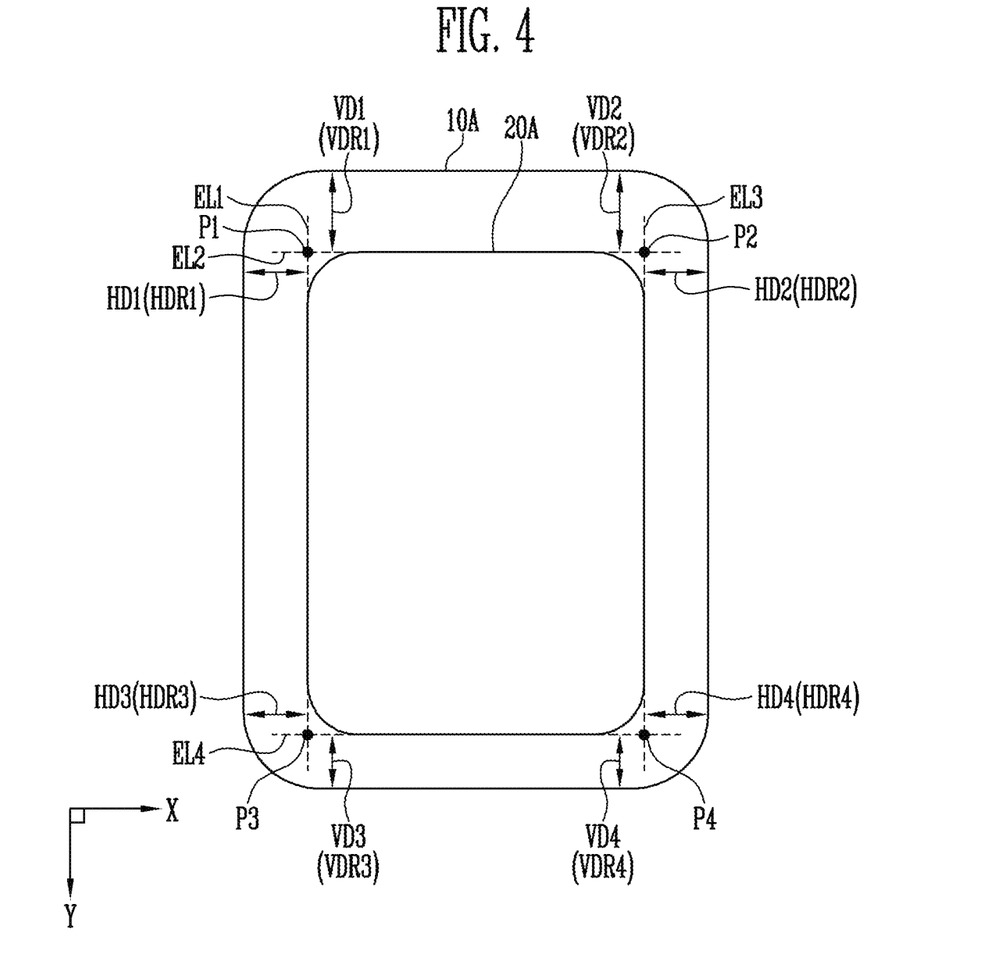
FIG. 4 is a diagram illustrating an example of an operation of an alignment calculator included in the alignment inspection apparatus of FIG. 1.
Figure 5:
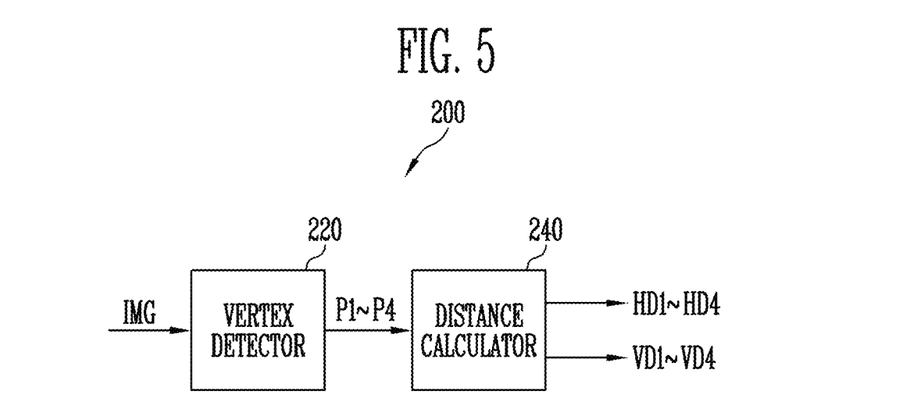
FIG. 5 is a block diagram illustrating an example of the alignment calculator of FIG. 4.

FIG. 4 is a diagram illustrating an example of an operation of an alignment calculator included in the alignment inspection apparatus of FIG. 1. FIG. 5 is a block diagram illustrating an example of the alignment calculator of FIG. 4.

Referring to FIGS. 4 and 5, the alignment calculator 200 may calculate a border of an upper plate 20A, first to fourth vertices P1 to P4, first to fourth horizontal distances HD1 to HD4, and first to fourth vertical distances VD1 to VD4.

In an embodiment, as illustrated in FIG. 4, the upper plate 20A may have a square shape with rounded corners or a rectangular shape with rounded corners. The alignment calculator 200 may define the upper plate 20A in a virtual rectangular shape using the image data IMG. For example, the alignment calculator 200 may connect some border information, or linear information, included in the image data IMG, and may calculate intersections of straight lines as the first to fourth vertices P1 to P4.

Similarly, the alignment calculator 200 may calculate a border, or outer border line, of the lower plate 10A based on the information of the lower plate 10A included in the image data IMG.

The alignment calculator 200 may calculate the distance between the vertices P1 to P4 and the border of the lower plate 10A. The shortest distance from the first vertex P1 to the border of the lower plate 10A in the X-axis direction X may be the first horizontal distance HD1, and the shortest distance from the first vertex P1 to the border of the lower plate 10A in the Y-axis direction Y may be the first vertical distance VD1. Similarly, the alignment calculator 200 may calculate the second horizontal distance HD2, that is, the shortest distance in the X-axis direction X from the second vertex P2 to the border of the lower plate 10A, and the second vertical distance VD2, that is, the shortest distance in the Y-axis direction Y from the second vertex P2 to the border of the lower plate 10A. The third horizontal distance HD3 may be the shortest distance in the X-axis direction X from the third vertex P3 to the border of the lower plate 10A. The third vertical distance VD3 may be the shortest distance in the Y-axis direction Y from the third vertex P3 to the border of the lower plate 10A. The fourth horizontal distance HD4 may be the shortest distance in the X-axis direction X from the fourth vertex P4 to the border of the lower plate 10A. The fourth vertical distance VD4 may be the shortest distance in the Y-axis direction Y from the fourth vertex P4 to the border of the lower plate 10A.

The horizontal distances and the vertical distances may be used to estimate widths of the non-overlapping area of the upper plate 20A on the lower plate 10A, and it may be determined whether or not the upper plate 20A is misaligned with the lower plate 10A.

The calculated first to fourth horizontal distances HD1 to HD4 and the calculated first to fourth vertical distances VD1 to VD4 may be included in the alignment data AD and may be provided to the misalignment detector 300.

The first vertex P1 and the second vertex P2 may form a first horizontal pair, and the third vertex P3 and the fourth vertex P4 may form a second horizontal pair. The first vertex P1 and the third vertex P3 may form a first vertical pair, and the second vertex P2 and the fourth vertex P4 may form a second vertical pair. Based on the pair information, the misalignment detector 300 may calculate horizontal sums of respective horizontal pairs and vertical sums of respective vertical pairs.

In some embodiments, as illustrated in FIG. 5, the alignment calculator 200 may include a vertex detector 220 and a distance calculator 240.

The vertex detector 220 may calculate first to fourth virtual extension lines EL1 to EL4 for the borders of the upper plate 20A using the image data IMG. The vertex detector 220 may determine the coordinates of the intersections of the first to fourth extension lines EL1 to EL4 as the first to fourth vertices P1 to P4 of the upper plate 20A.

The distance calculator 240 may calculate the horizontal distances and the vertical distances from each of the first to fourth vertices P1 to P4 to the border of the lower plate 10A. For example, the distance calculator 240 may extract the coordinates of a point of the border of the lower plate 10A parallel to the X-axis direction X from the first vertex P1, and calculates the coordinates of the first vertex P1 and the coordinates of the point to calculate the first horizontal distance HD1. In the same manner, the distance calculator 240 may calculate the second to fourth horizontal distances HD2 to HD4 and the first to fourth vertical distances VD1 to VD4.

Figure 6:
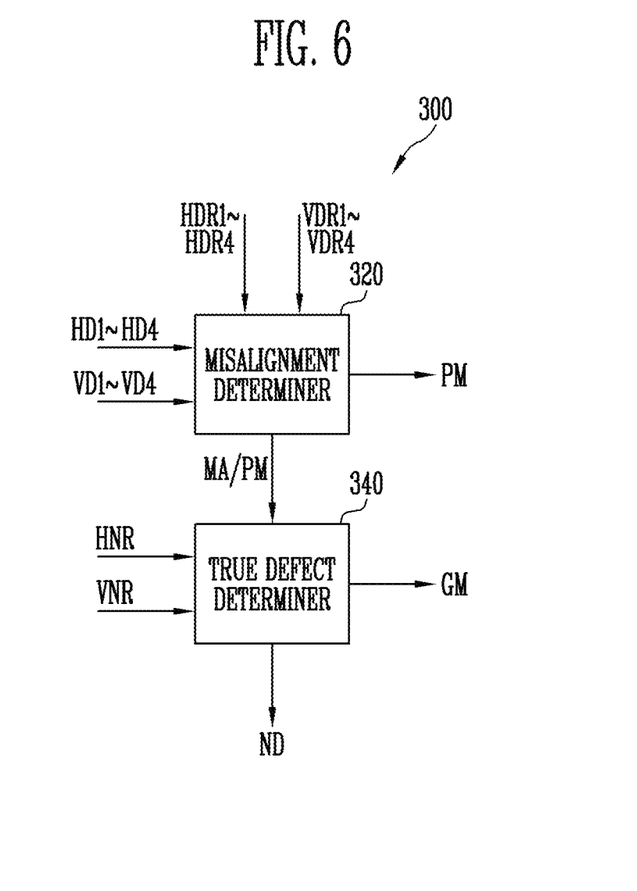
FIG. 6 is a diagram illustrating an example of a misalignment detector included in the alignment inspection apparatus of FIG. 1.

FIG. 6 is a diagram illustrating an example of a misalignment detector included in the alignment inspection apparatus of FIG. 1.

Referring to FIGS. 3 to 6, the misalignment detector 300 may include a misalignment determiner 320 and a true defect determiner 340.

The misalignment detector 300 may detect the true defect data GM obtained by filtering the noise data ND using the first to fourth horizontal distances HD1 to HD4 and the first to fourth vertical distances VD1 to VD4.

The misalignment detector 300 may generate misalignment data MA by comparing the first to fourth horizontal distances HD1 to HD4 with first to fourth horizontal distance references HDR1 to HDR4, respectively. The misalignment detector 300 may also generate the misalignment data MA by comparing the first to fourth vertical distances VD1 to VD4 with first to fourth vertical distance references VDR1 to VDR4, respectively.

The first to fourth horizontal distance references HDR1 to HDR4 may serve as references for determining whether or not the upper plate 20A is misaligned. In an embodiment, for example, the first through fourth horizontal distance references HDR1 through HDR4 may be set (e.g., predetermined) to about 1 mm.

For example, when the alignment between the upper plate 20A and the lower plate 10A is correct, the first to fourth horizontal distances HD1 to HD4 may correspond to the first to fourth horizontal distance references HDR1 to HDR4, respectively.

When the upper plate 20A is misaligned with respect to the lower plate 10A, the first to fourth horizontal distances HD1 to HD4 may deviate from, or be out of, the first to fourth horizontal distance references HDR1 to HDR4, respectively. For example, when the upper plate 20A is shifted to the right and laminated onto the lower plate 10A, the first and third horizontal distances HD1 and HD3 may be larger than the first and third horizontal distance references HDR1 and HDR3, and the second and fourth horizontal distances HD2 and HD4 may be smaller than the second and fourth horizontal distance references HDR2 and HDR4. When the upper plate 20A is shifted to the right and laminated onto the lower plate 10A, the misalignment determiner 320 may generate the misalignment data MA and provide the misalignment data MA to the true defect determiner 340.

For example, the misalignment data MA may be generated when at least one of the first to fourth horizontal distances HD1 to HD4 is out of an offset range (e.g., a predetermined offset range).

Likewise, the first through fourth vertical distance references VDR1 through VDR4 may also be used to determine whether the upper plate 20A is misaligned. In an embodiment, for example, the first to fourth vertical distance references VDR1 through VDR4 may be set (e.g., predetermined) to about 1.5 mm.

For example, when the alignment between the upper plate 20A and the lower plate 10A is correct, the first to fourth vertical distances VD1 to VD4 may correspond to the first to fourth vertical distance references VDR1 to VDR4, respectively.

When the upper plate 20A is misaligned with respect to the lower plate 10A, the first to fourth vertical distances VD1 to VD4 may be out of the first to fourth vertical distance references VDR1 to VDR4, respectively. For example, when the upper plate 20A is shifted downward and is laminated onto the lower plate 10A, the first and second vertical distances VD1 and VD2 may be larger than the first and second vertical distance references VDR1 and VDR2, and the third and fourth vertical distances VD3 and VD4 may be smaller than the third and fourth vertical distance references VDR3 and VDR4. The misalignment determiner 320 may generate the misalignment data MA and provide the misalignment data MA to the true defect determiner 340.

However, the above is described as an example, and the first through fourth vertical distance references VDR1 through VDR4 may have different values from each other or may have an offset range (e.g., a predetermined offset range).

In an embodiment, when the first horizontal distance HD1 is out of the first horizontal distance reference HDR1 and the second horizontal distance HD2 is out of the second horizontal distance reference HDR2, the misalignment determiner 320 may generate the misalignment data MA. In another embodiment, when the third horizontal distance HD3 is out of the third horizontal distance reference HDR3 and the fourth horizontal distance HD4 is out of the fourth horizontal distance reference HDR4, the misalignment determiner 320 may generate the misalignment data MA.

Likewise, in an embodiment, when the first vertical distance VD1 is out of the first vertical distance reference VDR1 and the third vertical distance VD3 is out of the third vertical distance reference VDR3, the misalignment determiner 320 may generate the misalignment data MA. In another embodiment, when the second vertical distance VD2 is out of the second vertical distance reference VDR2 and the fourth vertical distance VD4 is out of the fourth vertical distance reference VDR4, the misalignment determiner 320 may generate the misalignment data MA.

When the first to fourth horizontal distances HD1 to HD4 satisfy the first to fourth horizontal distance references HDR1 to HDR4, respectively, and the first to fourth vertical distances VD1 to VD4 satisfy the first to fourth vertical distance references VDR1 to VDR4, respectively, the misalignment determiner 320 may output the passed inspection data PM and the corresponding material may be determined as a normal product.

The first to fourth horizontal distances HD1 to HD4 and/or the first to fourth vertical distances VD1 to VD4 may be erroneously calculated due to the noise described with reference to FIG. 3. The true defect determiner 340 may determine and remove the noise data ND.

In some embodiments, the true defect determiner 340 may calculate a first horizontal sum (HD1+HD2), which is a sum of the first horizontal distance HD1 and the second horizontal distance HD2. Even if the upper plate 20A is shifted or twisted, the sizes of the upper plate 20A and the lower plate 10A have fixed values, such that the first horizontal sum (HD1+HD2) has a constant value. That is, the length obtained by adding the horizontal length of the upper plate 20A (e.g., the distance between the first vertex P1 and the second vertex P2) and the first horizontal sum (HD1+HD2) should be substantially equal to the horizontal length of the lower plate 10A. In other words, the first horizontal sum (HD1+HD2) should be substantially equal to a sum of the first horizontal distance reference HDR1 and the second horizontal distance reference HDR2 (HDR1+HDR2). When the first horizontal sum (HD1+HD2) is different from the sum of the first horizontal distance reference HDR1 and the second horizontal distance reference HDR2, the corresponding misalignment data MA may be regarded as including noise. Therefore, the misalignment data MA may be determined as the noise data ND and may be eliminated.

The true defect determiner 340 may compare the first horizontal sum (HD1+HD2) with a horizontal noise reference (e.g., a predetermined horizontal noise reference) HNR. In some embodiments, the horizontal noise reference HNR may be a sum of the first horizontal distance reference HDR1 and the second horizontal distance reference HDR2 and/or a sum of the third horizontal distance reference HDR3 and the fourth horizontal distance reference HDR4. Further, the horizontal noise reference HNR may include an offset range (e.g., a predetermined offset range).

The true defect determiner 340 may compare a second horizontal sum (HD3+HD4), which is the sum of the third horizontal distance HD3 and the fourth horizontal distance HD4, with the horizontal noise reference HNR. In some embodiments, when at least one of the first horizontal sum (HD1+HD2) and the second horizontal sum (HD3+HD4) is out of the horizontal noise reference HNR, the true defect determiner 340 may determine the misalignment data MA as the noise data ND. Since the noise data ND is pseudo-misalignment data, it cannot be used for misalignment determination. Therefore, the noise data ND may be immediately removed.

Likewise, the true defect determiner 340 may determine a first vertical sum (VD1+VD3), which is the sum of the first vertical distance VD1 and the third vertical distance VD3, and a second vertical sum (VD2+VD4), which is the sum of the second vertical distance VD2 and the fourth vertical distance VD4.

In some embodiments, when at least one of the first vertical sum (VD1+VD3) and the second vertical sum (VD2+VD4) is out of a vertical noise reference VNR, the true defect determiner 340 may determine the misalignment data MA as the noise data ND. The vertical noise reference VNR may correspond to the sum of the first vertical distance reference VDR1 and the third vertical distance reference VDR3 (VDR1+VDR3) and/or the sum of the second vertical distance reference VDR2 and the fourth vertical distance reference VDR4 (VDR2+VDR4). Further, the vertical noise reference VNR may include an offset range (e.g., a predetermined offset range).

When the first vertical sum (VD1+VD3) and the second vertical sum (VD2+VD4) satisfy the vertical noise reference VNR while the first horizontal sum (HD1+HD2) and the second horizontal sum (HD3+HD4) satisfy the horizontal noise reference HNR, the true defect determiner 340 may determine the misalignment data MA as the true defect data GM.

The material corresponding to the true defect data GM may be determined as a misaligned defective product.

In some embodiments, the true defect determiner 340 may determine whether the passed inspection data PM is true (intrinsic). For example, when at least one of the first horizontal sum (HD1+HD2) and the second horizontal sum (HD3+HD4) is out of the horizontal noise reference HNR, or when at least of the first vertical sum (VD1+VD3) and the second vertical sum (VD2+VD4) is out of the vertical noise reference VNR, the passed inspection data PM may be determined to contain noise. Therefore, in this case, the passed inspection data PM may be determined as the noise data ND.

In some embodiments, the true defect determiner 340 may not perform the true defect determination with respect to the passed inspection data PM. Thus, the speed of the alignment inspection may be improved.

As described above, the alignment inspection apparatus 1000 according to example embodiments may separate the misalignment data MA into the true defect data GM and the noise data ND based on the first to fourth horizontal distances HD1 to HD4 and the first to fourth vertical distances VD1 to VD4. Therefore, the erroneous alignment defect determination ratio according to the noise may be reduced, and the accuracy of the alignment inspection may be greatly improved. Accordingly, the productivity of the laminating facilities including the alignment inspection apparatus 1000 may be greatly increased with a reduced manufacturing cost.

Figure 7:
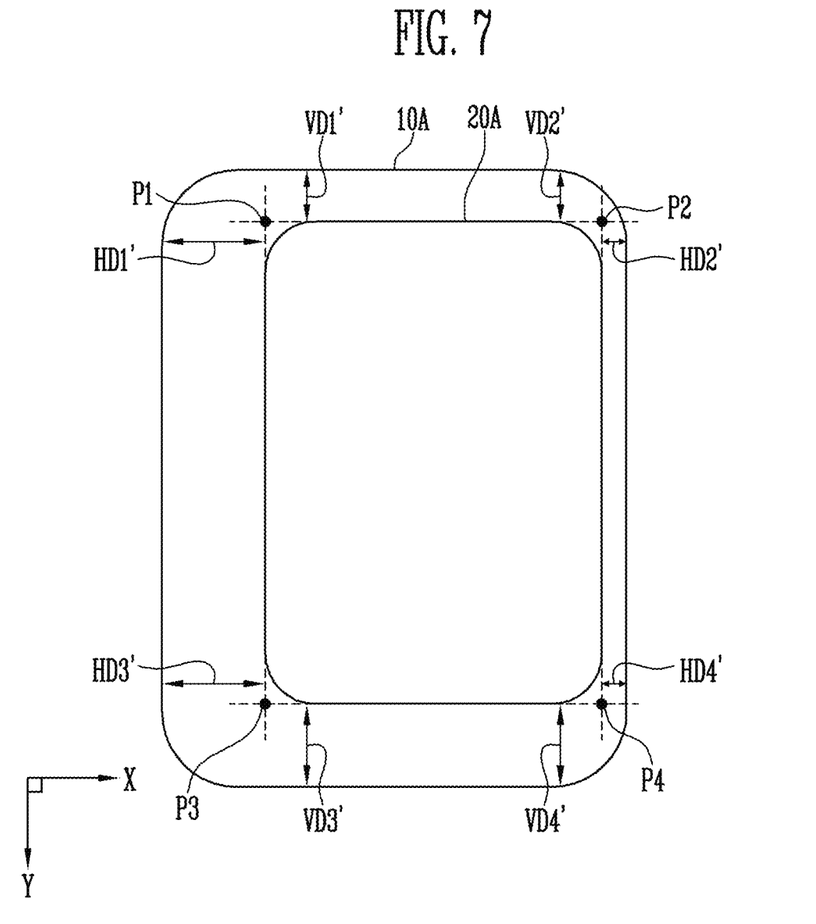
FIG. 7 is a diagram illustrating an example of a misaligned material.

FIG. 7 is a diagram illustrating an example of a misaligned material.

As illustrated in FIG. 7, the upper plate 20A may be shifted to the right and upward to be misaligned.

Referring to FIGS. 4, 6, and 7, a first horizontal distance HD1' and a third horizontal distance HD3' may increase, and a second horizontal distance HD2' and a fourth horizontal distance HD4' may decrease. In a case of intrinsic misalignment, both a first horizontal sum (HD1'+HD2') and a second horizontal sum (HD3'+HD4') may match the horizontal noise reference HNR (HDR1+HDR2).

Likewise, in the case of the intrinsic misalignment, a first vertical sum (VD1'+VD3') and a second vertical sum (VD2'+VD4') may match the vertical noise reference VNR (VDR1+VDR3).

Figure 8:
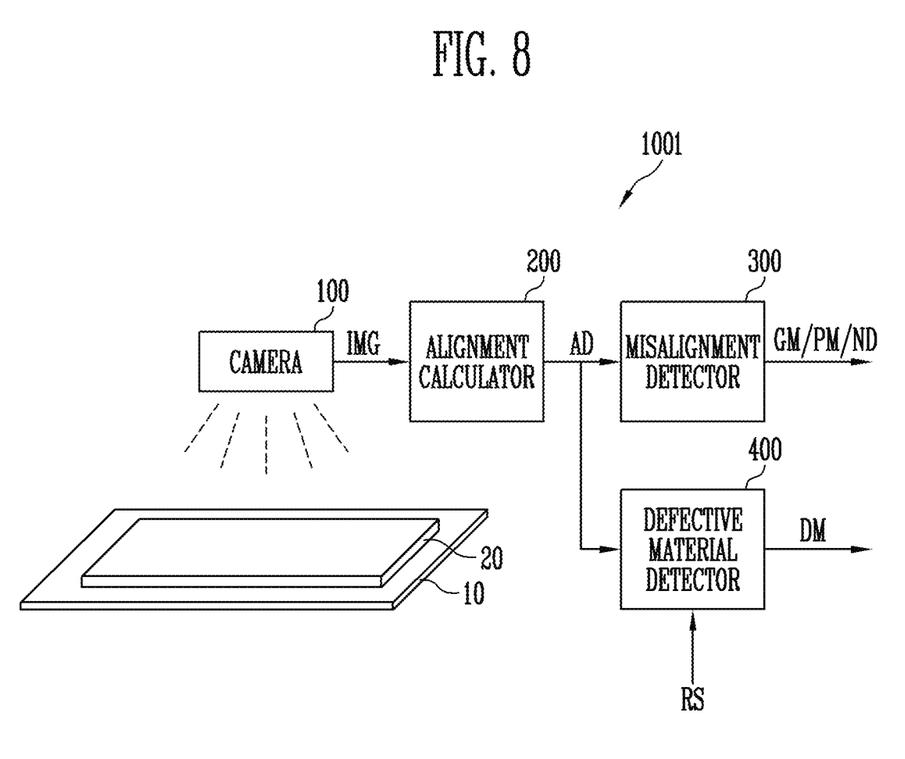
FIG. 8 is a block diagram of an alignment inspection apparatus according to an example embodiment.
Figure 9:
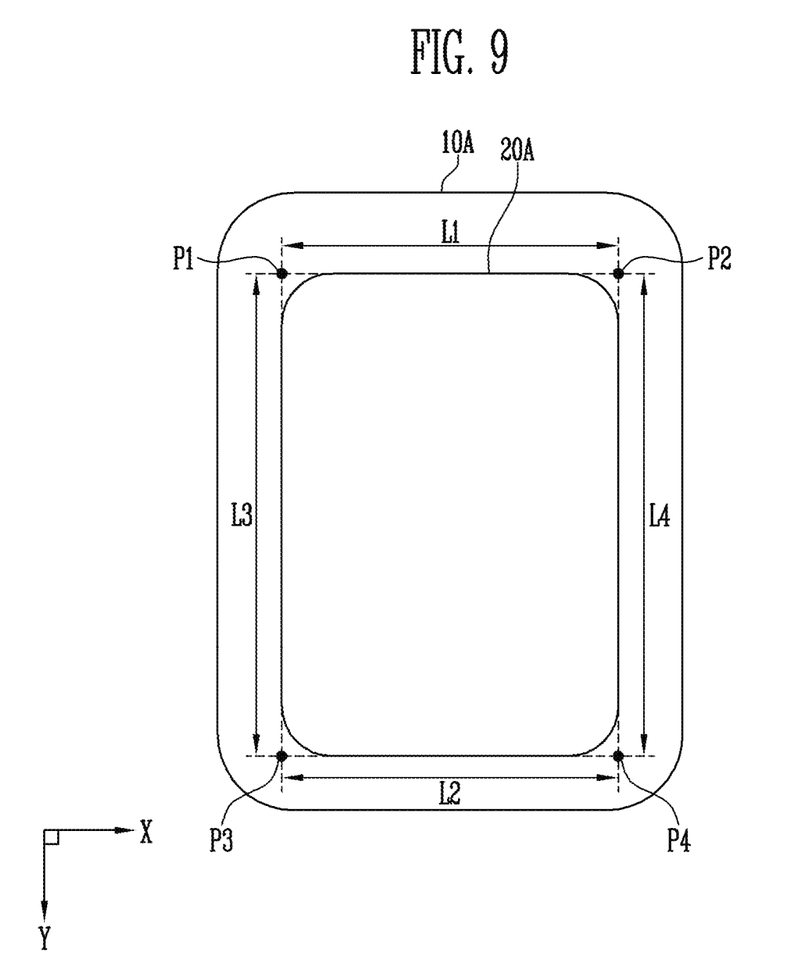
FIG. 9 is a diagram illustrating an example of an operation of a defective material detector included in the alignment inspection apparatus of FIG. 8.

FIG. 8 is a block diagram of an alignment inspection apparatus 1001 according to an example embodiment; and FIG. 9 is a diagram illustrating an example of an operation of a defective material detector included in the alignment inspection apparatus of FIG. 8.

In FIG. 8, like reference numerals are used to designate elements which are the same or similar as those shown in FIG. 1, and further description of these elements may be omitted. The alignment inspection apparatus 1001 of FIG. 8 may be substantially the same or similar to the alignment inspection apparatus 1000 of FIG. 1 except for a defective material detector 400.

Referring to FIGS. 8 and 9, the alignment inspection apparatus 1001 may include the camera, or camera unit, 100, the alignment calculator 200, the misalignment detector 300, and the defective material detector 400.

Since the configurations and operations of the camera 100, the alignment calculator 200, and the misalignment detector 300 are described above with reference to FIGS. 1 to 7, descriptions thereof will not be repeated.

The defective material detector 400 may detect a size of the upper plate 20A by calculating distances between the vertexes P1 to P4 obtained by the alignment calculator 200. In an embodiment, for example, the defective material detector 400 may detect a length L1 between the first vertex P1 and the second vertex P2 based on the coordinates of the first vertex P1 and the coordinates of the second vertex P2. The length L1 between the first vertex P1 and the second vertex P2 may correspond to one side of a rectangle defining the upper plate 20A. In the same manner, lengths L2 to L4 of remaining sides of the rectangle may be calculated. For example, the length L2 may be a distance between the third vertex P3 and the fourth vertex P4, the length L3 may be a distance between the first vertex P1 and the third vertex P3, and the length L4 may be a distance between the second vertex P2 and the fourth vertex P4. The size of the upper plate 20A may be determined from the lengths L1 to L4 of all sides of the rectangle.

The defective material detector 400 may determine whether the size of the material is defective by comparing the lengths L1 to L4 of all sides of the rectangle with a reference size (e.g., a preset reference size) RS. When at least one of the lengths L1 to L4 of all sides of the rectangle is out of the reference size RS, the defective material detector 400 may generate size defect data DM.

Thus, when a defective material is detected, a subsequent process may be stopped, and a feedback for disposal of defective material may be performed.

As described above, the alignment inspection apparatus 1001 may further detect the defective materials using the vertices information. Thus, the alignment inspection apparatus 1001 may perform both the alignment inspection and the material size defect inspection.

Figure 10:
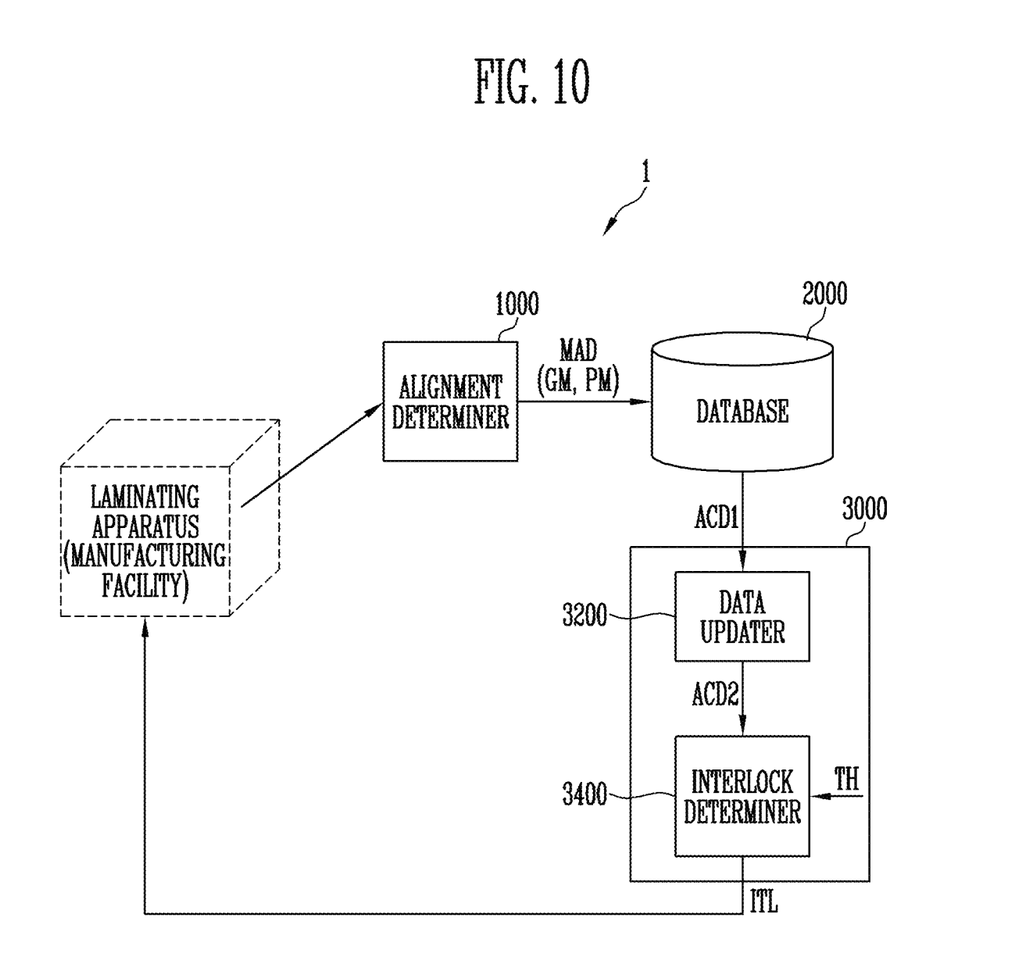
FIG. 10 is a block diagram of a lamination inspection system according to an example embodiment.
Figure 11:
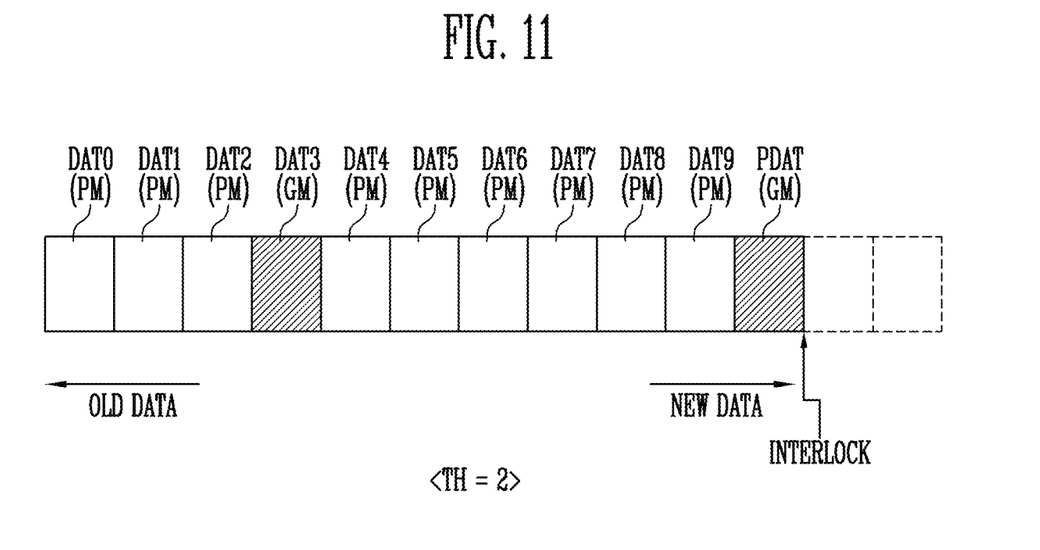
FIG. 11 is a diagram illustrating an example of an operation of the lamination inspection system of FIG. 10.

FIG. 10 is a block diagram of a lamination inspection system 1 according to an example embodiment; and FIG. 11 is a diagram illustrating an example of an operation of the lamination inspection system of FIG. 10.

Referring to FIGS. 10 and 11, the lamination inspection system 1 may include an alignment inspector, or alignment determiner, 1000 (e.g., the alignment inspection apparatus of FIG. 1 or FIG. 8), a database 2000, and an interlocker 3000.

The lamination inspection system 1 may determine an operation of a manufacturing facility (e.g., a laminating facility) by inspecting an alignment of a material (e.g., panels, or plates) laminated by the manufacturing facility.

The alignment inspector 1000 may perform an alignment inspection between upper and lower plates vertically laminated together. The alignment inspector 1000 may generate material data MAD by filtering noise data detected during the alignment inspection. The material data MAD may contain alignment data of each of the materials. For example, the material data MAD may include the passed inspection data PM or the true defect data GM of each material.

The alignment inspector 1000 may remove noise data without providing it to the database 2000.

The alignment inspector 1000 may be the alignment inspection apparatus of FIG. 1 or FIG. 8. Since the configuration and operation of the alignment inspector 1000 according to some embodiments are described above with reference to FIGS. 1 to 9, repeated descriptions will be omitted.

The database 2000 may store the material data MAD of the material having the laminated upper and lower plates. In some embodiments, the database 2000 may generate cumulative data ACD1 using stored material data MAD. The database 2000 may sequentially accumulate the material data MAD of the materials subjected to the alignment inspection.

The interlocker 3000 may generate an interlock signal ITL for shutting down the operation of the manufacturing facility based on the number of defective material data included in the current cumulative data ACD1 having a number (e.g., a predetermined number) of material data MAD. The defective material data may include the true defect data GM. For example, the material data MAD including the true defect data GM may be determined to be defective material data.

In some embodiments, the interlocker 3000 may include a data updater 3200 and an interlock determiner 3400.

The data updater 3200 may update the current cumulative data ACD1 by adding the current material data PDAT (see FIG. 11) to the current cumulative data ACD1 while removing the oldest material data included in the current accumulated data ACD1 at each alignment inspection for each of the materials.

In an embodiment, for example, the current cumulative data ACD1 may include ten recently inspected material data ACD1. For example, as illustrated in FIG. 11, the current cumulative data ACD1 may be updated by removing the oldest material data DAT0 while adding a current material data PDAT (the newest material data) to the cumulative data ACD1.

However, the above is provided as an example, and the number of material data MAD included in the current cumulative data ACD1 is not limited thereto.

The interlock determiner 3400 may compare the number of defective material data included in the updated current accumulated data ACD2 with a threshold value (e.g., a predetermined threshold value) TH. In some embodiments, the defective material data may be counted based on the true defect data GM. For example, as illustrated in FIG. 11, the material data DAT3 and PDAT including the true defect data GM may be counted as the defective material data. The materials corresponding to the material data DAT0, DAT1, DAT2, DAT4, DAT5, DAT6, DAT7, DAT8, and DAT9 including the passed inspection data PM may be determined as the normal products.

The interlock determiner 3400 may output the interlock signal ITL to stop, or shut down, the operation of the manufacturing facility when the number of defective material data reaches the threshold value TH. In an embodiment, for example, as illustrated in FIG. 11, the threshold value TH may be set to 2. When the defective material data is counted as 2 in the updated current cumulative data ACD2, the interlock signal ITL may be output.

The alignment inspection may be continuously performed when the number of defective material data included in the updated current cumulative data ACD2 is less than the threshold value TH. In some embodiments, the defective material corresponding to the defective material data may be separately transferred to an NG port (e.g., a disposal port) or the like.

As described above, the alignment inspection apparatus (the alignment inspector) according to example embodiments may separate the misalignment data into the true defect data and the noise data based on the first to fourth horizontal distances and the first to fourth vertical distances. Therefore, the erroneous alignment defect determination ratio caused by the noise may be reduced, and the accuracy of the alignment inspection may be greatly improved. Accordingly, the productivity of the laminating facilities including the alignment inspection apparatus may be greatly increased with a reduced manufacturing cost.

In addition, the lamination inspection system according to example embodiments may reduce the erroneous alignment defect determination rate caused by noise and may prevent or substantially prevent an unexpected shutdown of the operation of the manufacturing facility due to a once-off event of the defect detection. Therefore, the productivity of the manufacturing facility may be improved.

The foregoing is illustrative of some example embodiments, and is not to be construed as limiting thereof. Although a few example embodiments have been described, those skilled in the art will readily appreciate that many modifications are possible in the example embodiments without materially departing from the novel teachings and aspects of the embodiments. Accordingly, all such modifications are intended to be included within the scope of embodiments as set forth in the claims. In the claims, means-plus-function clauses are intended to cover the structures described herein as performing the recited function and not only structural equivalents but also equivalent structures. Therefore, it is to be understood that the foregoing is illustrative of some example embodiments and is not to be construed as limited to the specific embodiments disclosed, and that modifications to the disclosed example embodiments, as well as other embodiments, are intended to be included within the scope of the appended claims. The inventive concept is defined by the following claims, with equivalents of the claims to be included therein.

What is claimed is:

1. An alignment inspection apparatus comprising:
a camera configured to photograph an alignment between an upper plate and a lower plate which are laminated to generate image data of the alignment;
an alignment calculator configured to calculate horizontal distances and vertical distances in a non-overlapping area where the upper plate and the lower plate do not overlap with each other using the image data to generate alignment data; and
a misalignment detector configured to detect true defect data in which noise data is filtered using the horizontal distances and the vertical distances.

2. The apparatus of claim 1, wherein each of the horizontal distances corresponds to a shortest distance in a first direction from each vertex detected based on a border of the upper plate to a border of the lower plate.

3. The apparatus of claim 2, wherein each of the vertical distances corresponds to a shortest distance in a second direction from each vertex to the border of the lower plate.

4. The apparatus of claim 3, wherein the alignment calculator is configured to detect the upper plate as a virtual rectangle having first to fourth vertices using the image data, and to calculate first to fourth horizontal distances and first to fourth vertical distances based on the first to fourth vertices, respectively, and
wherein the first vertex and the second vertex form a first horizontal pair,
the third vertex and the fourth vertex form a second horizontal pair,
the first vertex and the third vertex form a first vertical pair, and
the second vertex and the fourth vertex form a second vertical pair.

5. The apparatus of claim 4, wherein the misalignment detector includes:
a misalignment determiner configured to respectively compare the first to fourth horizontal distances with first to fourth horizontal distance references and the first to fourth vertical distances with first to fourth vertical distance references to generate misalignment data; and
a true defect determiner configured to compare a first horizontal sum, which is a sum of the first horizontal distance and the second horizontal distance, with a horizontal noise reference, to compare a second horizontal sum, which is a sum of the third horizontal distance and the fourth horizontal distance, with the horizontal noise reference, to compare a first vertical sum, which is a sum of the first vertical distance and the third vertical distance, with a vertical noise reference, to compare a second vertical sum, which is a sum of the second vertical distance and the fourth vertical distance, with the vertical noise reference, and to determine whether the alignment data is true data based on results of the comparing.

6. The apparatus of claim 5, wherein the misalignment determiner is configured to generate the misalignment data when the first horizontal distance is out of the first horizontal distance reference and the second horizontal distance is out of the second horizontal distance reference.

7. The apparatus of claim 5, wherein the misalignment determiner is configured to generate the misalignment data when the third horizontal distance is out of the third horizontal distance reference and the fourth horizontal distance is out of the fourth horizontal distance reference.

8. The apparatus of claim 5, wherein the misalignment determiner is configured to generate the misalignment data when the first vertical distance is out of the first vertical distance reference and the third vertical distance is out of the third vertical distance reference.

9. The apparatus of claim 5, wherein the misalignment determiner is configured to generate the misalignment data when the second vertical distance is out of the second vertical distance reference and the fourth vertical distance is out of the fourth vertical distance reference.

10. The apparatus of claim 5, wherein the true defect determiner is configured to determine the misalignment data as the noise data when at least one of the first horizontal sum and the second horizontal sum is out of the horizontal noise reference.

11. The apparatus of claim 5, wherein the true defect determiner is configured to determine the misalignment data as the noise data when at least one of the first vertical sum and the second vertical sum is out of the vertical noise reference.

12. The apparatus of claim 5, wherein the true defect determiner is configured to determine the misalignment data as the true defect data when the first horizontal sum and the second horizontal sum satisfy the horizontal noise reference and the first vertical sum and the second vertical sum satisfy the vertical noise reference.

13. The apparatus of claim 1, wherein the alignment calculator comprises:
   a vertex detector configured to calculate virtual extension lines of borders of the upper plate by using the image data, and to determine coordinates of intersections of the virtual extension lines as vertices of the upper plate; and
   a distance calculator configured to calculate the horizontal distances and the vertical distances between the vertices and borders of the lower plate, respectively.

14. The apparatus of claim 13, further comprising a defective material detector configured to calculate distances between the vertices to detect a size of the upper plate, and to compare the size of the upper plate with a reference size to determine whether a size of a material is defective or not.

15. The apparatus of claim 14, wherein the defective material detector is configured to generate size defect data when the size of the upper plate is out of the reference size.

16. A lamination inspection system comprising:
   an alignment inspector configured to filter noise data and to inspect an alignment between an upper plate and a lower plate which are laminated by a manufacturing facility;
   a database configured to store material data including alignment data of upper and lower plates and true defect data;
   an interlocker configured to output an interlock signal to shut down the manufacturing facility based on a number of defective material data included in current cumulative data having a number of material data,
   wherein the alignment inspector comprises:
   a camera configured to photograph vertices of the upper plate to generate image data;
   an alignment calculator configured to calculate horizontal distances and vertical distances in a non-overlapping area where the upper plate and the lower plate do not overlap with each other using the image data to generate the alignment data; and
   a misalignment detector configured to detect the true defect data in which the noise data is filtered using the horizontal distances and the vertical distances, and
   wherein the defective material data includes the true defect data.

17. The system of claim 16, wherein the interlocker includes:
   a data updater configured to update the current cumulative data by adding current material data to the cumulative data while removing oldest material data included in the current cumulative data at each alignment inspection for each of the materials; and
   an interlock determiner configured to compare the number of defective material data included in the updated current cumulative data with a threshold value, and to output the interlock signal when the number of defective material data reaches the threshold value.

18. The system of claim 17, wherein the alignment inspector is configured to remove the noise data without providing the noise data to the database.

19. The system of claim 16, wherein the alignment calculator is configured to detect the upper plate as a virtual rectangle having first to fourth vertices using the image data, and to calculate first to fourth horizontal distances and first to fourth vertical distances based on the first to fourth vertices, respectively.

20. The system of claim 19, wherein the misalignment detector comprises:
   a misalignment determiner configured to respectively compare the first to fourth horizontal distances with first to fourth horizontal distance references and the first to fourth vertical distances with first to fourth vertical distance references to generate misalignment data; and
   a true defect determiner configured to compare a first horizontal sum, which is a sum of the first horizontal distance and the second horizontal distance, with a horizontal noise reference, to compare a second horizontal sum, which is a sum of the third horizontal distance and the fourth horizontal distance, with the horizontal noise reference, to compare a first vertical sum, which is a sum of the first vertical distance and the third vertical distance, with a vertical noise reference, to compare a second vertical sum, which is a sum of the second vertical distance and the fourth vertical distance, with the vertical noise reference, and to determine whether the alignment data is true data based on results of the comparing.

* * * * *